US008626205B2

(12) United States Patent
Chen et al.

(10) Patent No.: US 8,626,205 B2
(45) Date of Patent: Jan. 7, 2014

(54) WIRELESS COMMUNICATION SYSTEMS AND METHODS

(75) Inventors: Tao Chen, Salo (FI); Gilles Charbit, Farnborough (GB)

(73) Assignee: Broadcom Corporation, Irvine, CA (US)

(*) Notice: Subject to any disclaimer, the term of this patent is extended or adjusted under 35 U.S.C. 154(b) by 56 days.

(21) Appl. No.: 13/294,512

(22) Filed: Nov. 11, 2011

(65) Prior Publication Data

US 2013/0122901 A1    May 16, 2013

(30) Foreign Application Priority Data

Nov. 10, 2011    (GB) .................................. 1119428.9

(51) Int. Cl.
*H04W 4/00*    (2009.01)
(52) U.S. Cl.
USPC ........................... 455/458; 455/434; 370/329
(58) Field of Classification Search
USPC ........... 455/434, 435.1, 411, 458, 418; 726/3; 370/328
See application file for complete search history.

(56) References Cited

U.S. PATENT DOCUMENTS

2009/0094680 A1*  4/2009  Gupta et al. ....................... 726/3
2010/0112982 A1*  5/2010  Singh et al. .................... 455/411
2010/0238858 A1    9/2010  Kim et al.
2010/0323679 A1   12/2010  Yang
2011/0250885 A1* 10/2011  Zarri et al. ................. 455/435.1
2013/0059581 A1*  3/2013  Sebire ........................... 455/434

FOREIGN PATENT DOCUMENTS

| EP | 2 134 111 A1 | 12/2009 |
| EP | 2 398 266 A2 | 12/2011 |
| WO | WO 2010/040426 A1 | 4/2010 |
| WO | WO 2010/093198 A2 | 8/2010 |

OTHER PUBLICATIONS

UK IPO Combined Search and Examination Report under Section 17 and 18(3) dated Mar. 9, 2012 issued in a related British Application No. GB 1119428,9 (6 pages).
3rdGeneration Partnership Project et al: "System Improvements for Machine-Type Communications (Release 11)," 3GPP TR 23.888 V1.5.0, vol. 23.888, No. V1. 5.0., Oct. 1, 2011, pp. 1-155, XP002674781 (155 pages).

* cited by examiner

*Primary Examiner* — Nizar Sivji
(74) *Attorney, Agent, or Firm* — Lucas & Mercanti LLP; Robert P. Michal

(57) ABSTRACT

Embodiments of the invention provide methods, devices and computer programs arranged to control access to a cell in a communication network. One embodiment comprises an apparatus comprising a processing system arranged to cause the apparatus to: receive a plurality of Closed Subscriber Group identifiers (CSG IDs) assigned to the cell; select and transmit a first CSG ID from the plurality of CSG IDs on the basis of a first load condition on the cell; and select and transmit a second, different, CSG ID from the plurality of CSG IDs on the basis of a second, different, load condition on the cell.

16 Claims, 6 Drawing Sheets

WIRELESS COMMUNICATION SYSTEMS AND METHODS

CROSS-REFERENCE TO RELATED APPLICATION

This application claims the benefit under 35 U.S.C. §119 of UK Patent Application No. 1119428.9 filed on Nov. 10, 2011, the entire disclosure of which is incorporated herein by reference.

TECHNICAL FIELD

The present invention relates generally to wireless communication systems, methods, devices and computer programs, and more specifically relates to controlling access to a private cell such as a closed subscriber group in a communication network.

BACKGROUND

The following abbreviations used in the specification and/or the drawings are defined as follows:
3GPP third generation partnership project
CSG closed subscriber group
DL downlink (network towards UE)
eNodeB base station of a LTE/LTE-A system
E-UTRAN evolved universal terrestrial radio access network
ID identifier
LTE long term evolution (of the E-UTRAN system)
MAC medium access control
MME mobility management entity
MTC machine type communication
NAS non-access stratum
PLMN public land mobile network
S-GW serving gateway
SIB1 System Information Block Type1
SIB2 System Information Block Type2
SCH shared channel
RRC radio resource control
UE user equipment
UL uplink (UE towards network)

In the E-UTRAN system there are conventional network access nodes/cells termed eNodeBs which serve all users, and also subscriber group CSG cells such as home eNodeBs which are available for traffic (voice and/or data) to only those subscribers registered with the CSG and possibly also certain allowed guests. Any given CSG may include a group of cells (such as a corporate or university campus) or a single cell. CSGs may allow traffic access for non-subscribers for emergency calls or routine, non-emergency access.

These different types of cells or access nodes may be termed more generally as public access nodes/public cells and private access nodes/private cells. Other wireless systems (GERAN, GSM, UTRAN, WCDMA) have either implemented or are considering implementing similar such private networks as more functionality is shifted from higher in the radio access network toward the base stations/access nodes.

There are two types of conventional closed subscriber group (CSG) implementations, namely CSG-aware user equipment (UE) and non-CSG-aware UE. In the CSG-aware UE implementation, CSG subscription data is maintained at the home location register and is retrieved by mobility management entities, such as MME, MSC/VLR, SGSN, as part of UE's subscription profile. In the LTE system the CSG-aware UE maintains a list, termed a CSG whitelist or CSG allowed list, which lists the identities of the CSG cells for which that particular UE has access rights. 3GPP TS 23.401 states that the UE is to keep this CSG whitelist, which can be either the "allowed CSG list" or the "operator CSG list" contained in the so-called UE context which is provided by the UE's home network to any other networks the UE is transiting. Each CSG list has the form of a list of CSG IDs and the associated PLMNs. Each CSG ID reliably identifies a CSG, which as above might include a single CSG cell or multiple CSG cells. Prior to requesting access to a CSG cell, UEs verify whether its CSG ID is in their white list, and only request access if it is. Users can override this automatic CSG cell screening by manually selecting a CSG cell that is not in their UE's allowed list.

When a CSG-aware UE accesses such a CSG cell, the MME/SGSN/MSCNLR checks that the CSG ID of the CSG cell corresponds to a CSG ID in the CSG subscription data, and that the relevant validity criteria are met.

As regards the non-CSG-aware UE implementation, CSG subscription data is maintained by CSG operation, administration and maintenance (OAM) function.

Access to CSG cells may be further controlled on the basis of service operator assigned classes. There are 15 such classes (0-9 assigned to low priority users (so-called "Ordinary UEs") and 11-15 assigned to high priority users, such as emergency services), and the entire population of UEs are allocated to a service access class. If any given CSG cell allows, for example, service access class 0 to camp on its cell, then if there are 100,000 users of this class, this gives rise to a significant number of users that may potentially require access to the given CSG cell.

Ordinary UEs are barred from accessing a given CSG cell based on RRC configuration parameters for access barring that are broadcasted on SIB2 (i.e. access class barred, barring rates, barring probability). The broadcast of enhanced access barring by the RAN has been proposed in TR 23.888 v11.1.2 in order to restrict a specific congesting MTC Group/APN from attempting access to a CSG cell, or to prevent all MTC Devices, low-priority MTC Devices, and/or MTC Devices of a PLMN type from attempting access. The RRC and/or NAS rejection back-off times and MTC access barring randomization can successfully prevent the rejected/barred MTC Devices from almost simultaneously initiating access attempts after the congestion scenario or the overload scenario have subsided.

The aforementioned access barring mechanism for Ordinary UEs is based on their access class, and, as alluded to above, since there are a significantly larger number of low priority users than high priority users, it applies to relatively large mobile populations. While such barring mechanisms are suited to special scenarios where UEs may be prevented from making access attempts in case of states of emergency, they are not suitable as a means to prevent low-priority UEs from making access attempts to a eN odeB based on congestion or overload considerations.

Embodiments are directed towards providing an improved method of controlling access to private cells such as CSG cells.

SUMMARY

In a first exemplary embodiment of the invention there is provided an apparatus for use in controlling access to a cell in a communication network, the apparatus comprising a processing system, which may be embodied as at least one processor and at least one memory including a computer program code, wherein the at least one memory and the computer program code are configured to, with the at least one processor, cause the apparatus at least to: receive a plurality of Closed Subscriber Group identifiers (CSG IDs) assigned to the cell; select and transmit a first CSG ID from the plurality of CSG IDs on the basis of a first load condition on the cell; and select and transmit a second, different, CSG ID from the plurality of CSG IDs on the basis of a second, different, load condition on the cell.

The first exemplary embodiment is most conveniently implemented in a radio access node.

In a second exemplary embodiment of the invention there is provided a method of controlling access to a cell in a communication network, the method comprising: receiving a plurality of Closed Subscriber Group identifiers (CSG IDs) assigned to the cell; selecting and transmitting a first CSG ID from the plurality of CSG IDs on the basis of a first load condition on the cell; and selecting and transmitting a second, different, CSG ID from the plurality of CSG IDs on the basis of a second, different, load condition on the cell.

The first and second exemplary embodiments are most conveniently implemented in a radio access node. Embodiments also include a computer program product comprising a set of instructions, which, when executed by a radio access node, cause the radio access node to perform a method according to the second embodiment.

In a third exemplary embodiment of the invention there is provided an apparatus for use in controlling access by a user equipment to at least one cell in a communication network, the apparatus comprising a processing system, which may be embodied as at least one processor and at least one memory including a computer program code, wherein the at least one memory and the computer program code are configured to, with the at least one processor, cause the apparatus at least to: store in a memory a list of a plurality of Closed Subscriber Group identifiers (CSG ID) corresponding to the at least one cell to which the apparatus is authorised to access; while being served by the at least one cell in respect of a first CSG ID for the cell, receive a transmission comprising a second, different, CSG ID for the cell; and compare the received second CSG ID with CSG ID on the list to determine whether the apparatus is authorised to continue to be served by the cell.

In a fourth exemplary embodiment there is provided a method of controlling access by a user equipment to at least one cell in a communication network, the method comprising: storing in a memory a list, of a plurality of Closed Subscriber Group identifiers (CSG ID) corresponding to the at least one cell to which the apparatus is authorised to access; while being served by the at least one cell in respect of a first CSG ID for the cell, receiving a transmission comprising a second, different, CSG ID for the cell; and comparing the received second CSG ID with CSG ID on the list to determine whether the apparatus is authorised to continue to be served by the cell.

The third and fourth exemplary embodiments are most conveniently implemented in a User Equipment (UE). Embodiments also include a computer program product comprising a set of instructions, which, when executed by a UE, cause the UE to perform a method according to the fourth embodiment.

In a fifth exemplary embodiment of the invention there is provided an apparatus for use in maintaining at least one cell in a communication network, the apparatus comprising a processing system, which may be embodied as at least one processor and at least one memory including a computer program code, wherein the at least one memory and the computer program code are configured to, with the at least one processor, arranged to cause the apparatus to: assign a plurality of Closed Subscriber Group identifiers (CSG ID) to a cell; associate a cell load condition with each of the plurality of CSG IDs; assign to each of said plurality of CSG IDs a set of at least one user equipment identifiers; and transmit data indicative of said assignment for use in access control to the cell.

In a sixth exemplary embodiment there is provided method of maintaining at least one cell in a communication network, the method comprising: assigning a plurality of Closed Subscriber Group identifiers (CSG ID) to a cell; associating a cell load condition with each of the plurality of CSG IDs; assigning to each of said plurality of CSG IDs a set of at least one user equipment identifiers; and transmitting data indicative of said assignment for use in access control to the cell.

The fifth and sixth exemplary embodiments are most conveniently implemented in a CSG management entity Embodiments also include a computer program product comprising a set of instructions, which, when executed by a closed subscriber group administration server, cause the closed subscriber group administration server to perform a method according to the sixth embodiment.

These and other embodiments and aspects are detailed below with particularity.

DETAILED DESCRIPTION

Embodiments are concerned with improving access to CSG cells so that more users of low priority can access such cells even when co-located high priority are making use of the cell's resources.

Figure 1:
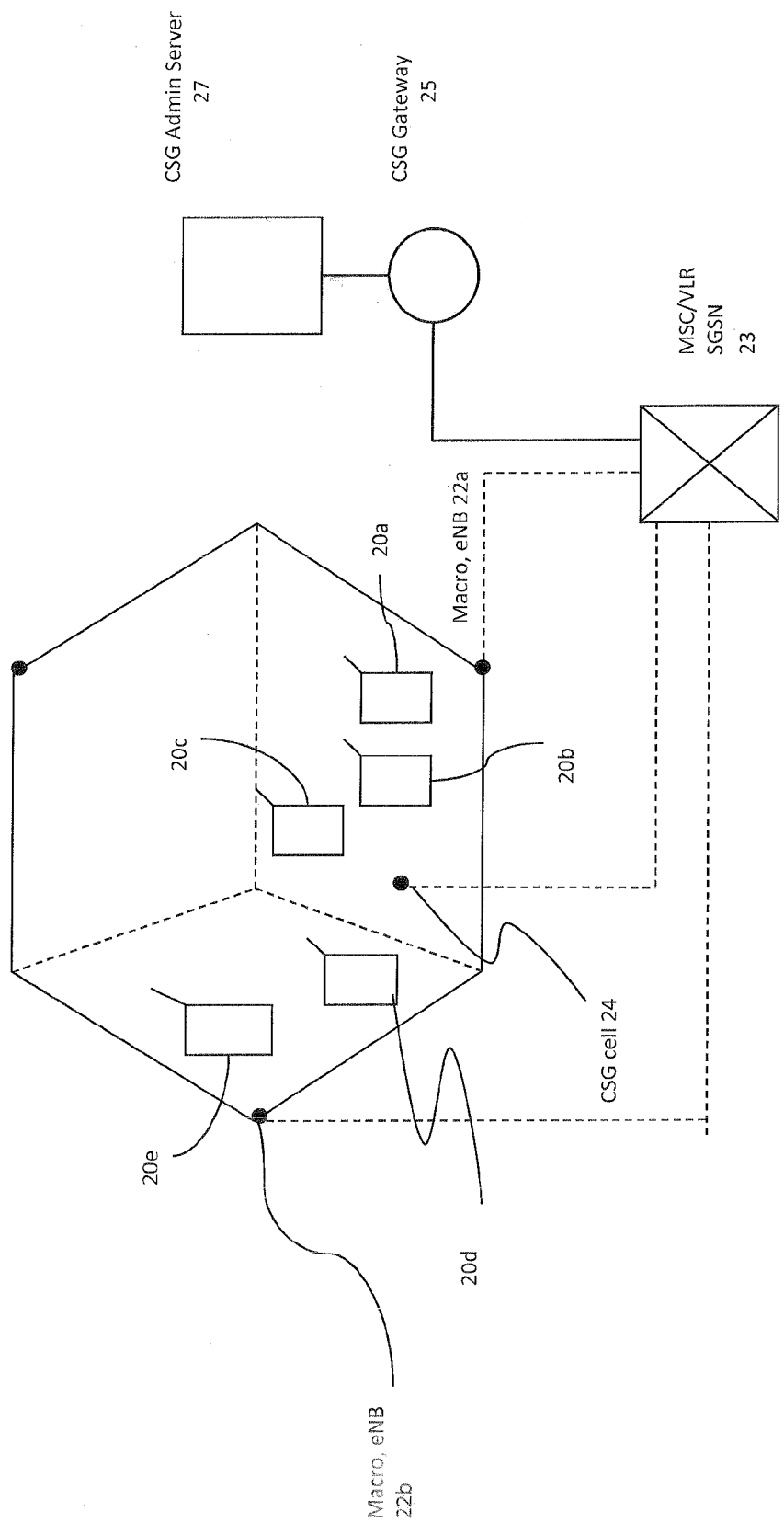
FIG. 1 is a schematic diagram illustrating an environment in which embodiments may be practiced to advantage.

FIG. 1 illustrates an exemplary wireless environment within which embodiments may be practiced; as can be seen, a plurality of UEs 20a-20e are connected to one of macro cells 22a, 22b and CSG cell 24. While only one is shown, in practice there may be many CSG cells from different CSGs and the UEs may be a subscriber to only one or a few of those CSGs. In the arrangement shown in FIG. 1, UEs 20c, 20d and 20e are connected to CSG 24. The various radio access nodes 22a, 22b, 24 communicate with mobility management entities, such as MME, MSC/VLR, SGSN 23 to validate or otherwise access to a given radio access node on the basis of the UE's subscription profile. The wireless environment is in communication with various CSG management entities, namely a CSG gateway 25 and CSG Admin Server 27, which manages the list of subscribers for a CSG, i.e., the access control list for the CSG cells, and provisions UEs with CSG cells that the UEs are allowed to access.

Figure 2:
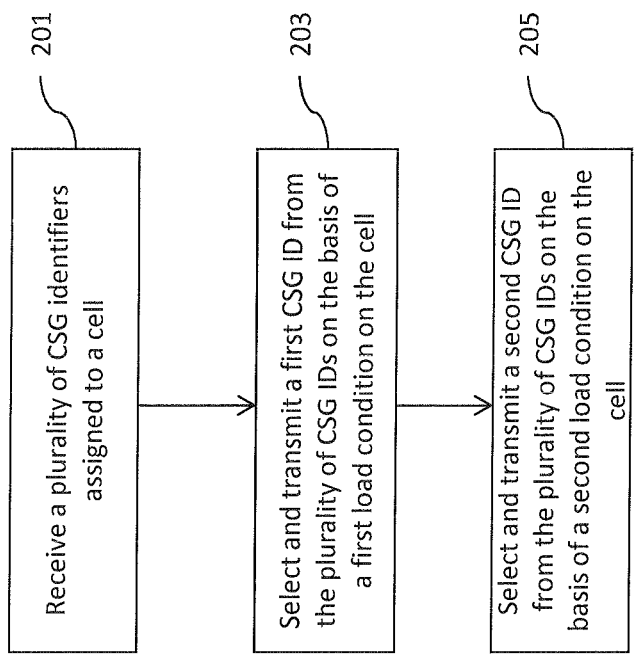
FIG. 2 is a logic flow diagram that illustrates the operation of a method, and a result of execution of computer program instructions embodied on a computer readable memory, in accordance with the exemplary embodiments.

Referring to FIG. 2, in accordance with an exemplary embodiment, the CSG cell 24 receives a plurality of Closed Subscriber Group identifiers (CSG IDs) assigned to the cell (step 201). These CSG IDs may be received from the aforementioned CSG management entity such as the CSG Admin Server 27 via the CSG gateway 25. Thereafter, the CSG cell 24 selects and transmits a first CSG ID from the plurality of CSG IDs on the basis of a first load condition on the cell (step 203); and separately selects and transmits a second, different, CSG ID from the plurality of CSG IDs on the basis of a second, different, load condition on the cell (step 205).

As will be explained in more detail below, UEs are associated and preconfigured, e.g. via locally maintained whitelists, with one or ones of the plurality of CSG IDs; in this way, the CSG cell can provide time-varying access thereto for a greater number of UEs than is possible with conventional methods. Furthermore, as the selection and transmission of a given CSG ID is dependent on cell loading conditions, it can dynamically modify the UEs that are able to camp on the cell based on local conditions, thereby actively reacting to usage of its radio resources.

The load conditions may be dependent on cell operational characteristics, as determined by the CSG cell 24, such as the state of at least one cell resource, at least one cell buffer, at least one cell channel, the state of traffic within the cell, predetermined types of traffic in the cell, quality of service in the cell, failure rate associated with access requests received by the cell, and the number of UEs currently served by the cell.

In preferred arrangements, the first CSG ID is transmitted by the CSG cell 24 for a first time period, and the second CSG ID is transmitted by the CSG cell 24 for a second time period. The first and second CSG IDs may be within a group of CSG IDs, which may comprise CSG IDs in addition to the first and second IDs, in which case the cell 24 may transmit the respective IDs within consecutive time periods. In at least some arrangements respective CSG IDs are broadcast by the CSG cell 24, and the duration of time periods within which a respective said CSG ID is broadcast may be the same for all CSG IDs to be broadcast, or may vary in dependence on cell conditions. In particular, if a given CSG cell is running low on resources, it may select and broadcast a CSG ID that corresponds to higher priority users. As is described below, the mapping between CSG ID and UEs is configured by the CSG admin server 27, so that, in one sense, the CSG cell 24 is able to select a CSG ID to transmit based on an effective access priority of the CSG IDs.

The CSG IDs may be broadcast on SIB1 by the CSG 24, and received according to conventional methods by UEs within the CSG cell 24.

As mentioned above, each CSG ID has a set of UEs associated therewith, this having been defined by e.g. the CSG Admin Server 27 in communication with the various mobility management entities 23 and the CSG cell 24 via the CSG gateway 25. The CSG Admin Server 27 may classify UEs into the afore-mentioned groups on the basis of e.g. Quality of Service (QoS) profile and device type. Each UE in a given CSG group may, in this way, be configured with zero, one, or a plurality of CSG IDs in their respective whitelists. The group assignment could further be dependent on load conditions, specified by the CSG Admin Server 27, as can be expected to be experienced by the CSG cell 24. A CSG management entity such as a CSG Admin Server 27 therefore assigns the CSG IDs and allocates them to UEs. Subsequent use of a given CSG ID in a given broadcast period is managed by the CSG cell 24 and dependent on runtime cell loading conditions.

In this way the CSG cell 24 allows different groups of UEs access to the CSG cell using PRACH resources via broadcasting different CSG IDs at different points in time, thereby providing a means of load and admission control by time sharing among UEs.

As mentioned above, the access priority of a given CSG ID may be coupled to access priority of UEs, which is to say that CSG IDs corresponding to higher priority users could have a higher access priority. This enables the aforementioned flexibility of enabling the CSG cell 24 to select and broadcast a CSG ID corresponding to higher priority users in the event that a given CSG cell is running low on resources. In addition, for higher priority users, more than one CSG IDs may be configured for their UEs, thereby enabling access to such UEs during varying load conditions.

Figure 3:
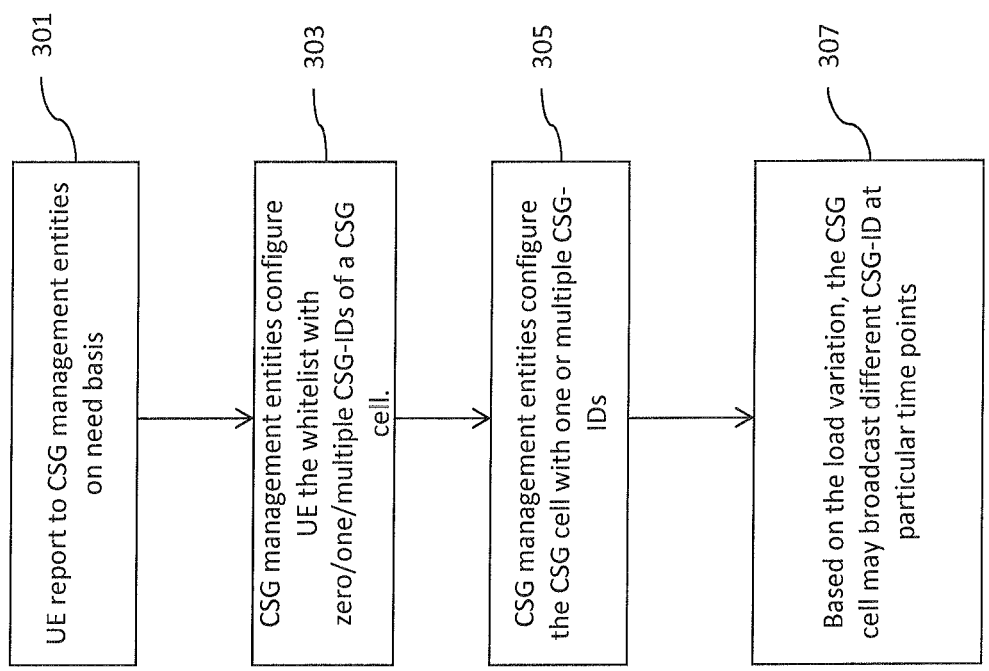
FIG. 3 is a flow diagram that illustrates the various steps performed by UE, CSG management entities and a CSG cell according to embodiments.

An overview of the steps performed by the various entities will now be described with reference to FIG. 3. At step 301, UEs report to CSG management entities such as a CSG List Server. The CSG Admin Server 27 provisions the UEs with a whitelist comprising zero/one/a plurality of CSG IDs for the CSG cell 24 (step 303). Thereafter the CSG List Server assigns CSG IDs to various CSGs, including CSG 24 (step 305) on the basis of e.g. QoS profile and device type, preferably in the form of groups of CSG IDs, which may or may not have priority status associated therewith. For example, it may be assumed that, following step 305, CSG cell 24 has been configured with three CSG IDs {A, B, C}, and that UEs are divided into several groups, UEgrp(1) . . . UEgrp(5). Further, it may be assumed for illustrative purposes that CSG ID A has been assigned to UEgrp(1) and UE grp(4); that CSG ID B has been assigned to UEgrp(2); and that CSG ID C has been assigned to UEgrp(3). There is no CSG ID configured for UEgrp(5).

Having received the CSG ID group information, the CSG cell 24 dynamically broadcasts different CSG IDs at different points in time based, e.g., on the load experienced by the cell 24 (step 307). An exemplary broadcast schedule may comprise the following:

| CSG-ID broadcast by cell 24 | A | B | C | A | B | C | A | A | C |
|---|---|---|---|---|---|---|---|---|---|
| UEgrp (1) | ✓ |   |   | ✓ |   |   | ✓ | ✓ |   |
| UEgrp (2) |   | ✓ |   |   | ✓ |   |   |   |   |
| UEgrp (3) |   |   | ✓ |   |   | ✓ |   |   | ✓ |
| UEgrp (4) | ✓ | ✓ |   | ✓ | ✓ |   | ✓ | ✓ |   |
| UEgrp (5) |   |   |   |   |   |   |   |   |   |

As UEgrp(5) has no valid CSG ID, none of the T ICS in that group can obtain access to the CSG ID during this period.

As mentioned above, the duration of the respective broadcast periods could be dependent on changes to loading on the cell and/or conditions of the cell, as measured by the CSG cell 24. Further, UEs with a higher priority can be configured with more than one CSG ID for this CSG cell 24, meaning that these UEs can effectively be served by the CSG 24 for a longer period of time.

As is also described above, the UEs maintain a whitelist of CSG IDs, this having been provisioned to the UEs at step 303. Not all UEs have the same list of CSG IDs in their whitelist, as, for example, different UEs are assigned different priorities. That being the case, when the CSG cell 24 broadcasts a change to the CSG ID, it may be expected that at least some of the UEs currently being served by the current CSG ID may not be able to continue to be able to be served by the CSG cell 24 when it broadcasts a different CSG ID.

Embodiments of the invention provide a particularly advantageous mechanism for providing this CSG ID information to the UE, as will now be explained. When the CSG cell 24 is due to change CSG ID, the CSG cell 24 may transmit a paging message to the UEs currently being served by the CSG cell 24, which causes the UEs to check for a system information update SIB1. Upon receipt of the paging message, the connected UEs are triggered to check the CSG ID and CSG indication that is broadcast on SIB1. For those UEs that have this CSG ID on their whitelist, they are able to continue to receive service from the CSG cell 24, whereas those UEs that do not have this CSG ID on their whitelist may initiate a handover to another cell.

By paging the connected UEs with information identifying a broadcast system update there is no need for a UE to send a RACH in the CSG cell 24, and thus avoids the need for any dedicated RRC signaling.

By way of an example, it is assumed that UEs within UEgrp(1) and UEgrp(2) have registered with the network and may be in RRC_IDLE or RRC_CONNECTED state. It is further assumed that these UEs within the CSG cell area 24 can be paged to indicate a system information update SIB1 by the currently serving cell 24. The CSG cell 24 then broadcasts CSG ID B in the next BCCH modification period with the new system information SIB1.

Upon receiving the paging message, UEs in UEgrp(1) and UEgrp(2) will check the CSG ID and CSG indication broadcast on SIB1. UEs in UEgrp(1) will still be able to access the cell because CSG ID B is in the whitelist for this group of users; however, UEs in UEgrp(2) will not be allowed to access the cell as CSG ID B is not in its whitelist.

As regards the UEs in UEgrp(2), two scenarios are possible:

(i) If UEs were in RRC_IDLE state the UEs will reselect another suitable cell.

In this case, no network signaling is needed for the reselection, as the UEs may have autonomously re-selected an eNodeB cell without re-attaching to the network (i.e the UEs camp on a suitable LTE cell such as 22a shown in FIG. 1). These UEs are known to the relevant MME entity via the EPS Mobility Management Protocol responsible for tracking area update (TAU) to keep track of UEs in RRC_IDLE mode, and the tracking area typically covers a number of eNodeBs such as 22a, 22b.

(ii) If UE was in RRC_CONNECTED state, the UE will handover to another cell.

Handover to another suitable cell (i.e. the accessible cell based on CSG configuration) while in RRC_CONNECTED state is performed via conventional handover procedures.

FIG. 2, described above, is a logic flow diagram which describes, broadly, the above exemplary embodiments from the perspective of the CSG cell 24.

Figure 4:
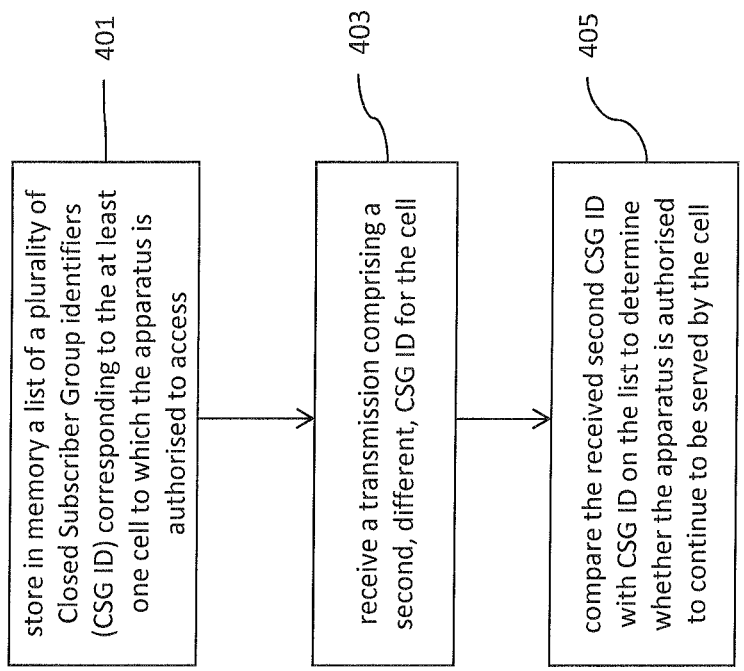
FIG. 4 is a logic flow diagram that illustrates the operation of a method, and a result of execution of computer program instructions embodied on a computer readable memory, in accordance with the exemplary embodiments.

FIG. 4 is a logic flow diagram which describes, broadly, the above exemplary embodiments from the perspective of a UE 20b. In step 401, the UE stores in memory a list of a plurality of Closed Subscriber Group identifiers (CSG ID) corresponding to the at least one cell to which the apparatus is authorised to access. At step 403, and while being served by the at least one cell in respect of a first CSG ID for the cell, the UE receives a transmission comprising a second, different, CSG ID for the cell. Thereafter, at step 405, the UE may compare the received second CSG ID with CSG ID on the list to determine whether the apparatus is authorised to continue to be served by the cell.

Figure 5:
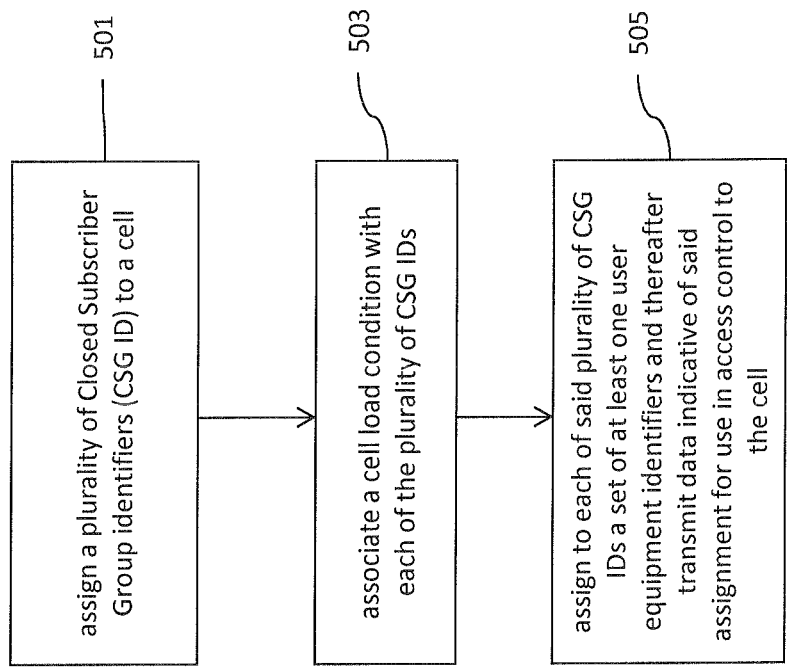
FIG. 5 is a logic flow diagram that illustrates the operation of a method, and a result of execution of computer program instructions embodied on a computer readable memory, in accordance with the exemplary embodiments.

FIG. 5 is a logic flow diagram which describes, broadly, the above exemplary embodiments from the perspective of a CSG management entity. In step 501, the CSG management entity may assign a plurality of Closed Subscriber Group identifiers (CSG ID) to a cell. At step 503, the CSG management entity may associate a cell load condition with each of the plurality of CSG IDs, assign to each of said plurality of CSG IDs a set of at least one user equipment identifiers and thereafter transmit data indicative of said assignment for use in access control to the cell (steps 503, 505).

FIGS. 2, 4 and 5 represent results from executing a computer program or an implementing algorithm stored in the local memory of the CSG cell 24, UE 20b and CSG management entity respectively as well as illustrating the operation of a method and a specific manner in which the processor and memory with computer program/algorithm are configured to cause the CSG cell 24, UE 20b and CSG management entity respectively (or one or more components thereof) to operate. The various blocks shown in these Figures may also be considered as a plurality of coupled logic circuit elements constructed to carry out the associated function(s), or specific result or function of strings of computer program code stored in a computer readable memory. Such blocks and the functions they represent are non-limiting examples, and may be practiced in various components such as integrated circuit chips and modules, and that the exemplary embodiments of this invention may be realized in an apparatus that is embodied as an integrated circuit. The integrated circuit, or circuits, may comprise circuitry (as well as possibly firmware) for embodying at least one or more of a data processor or data processors, a digital signal processor or processors, baseband circuitry and radio frequency circuitry that are configurable so as to operate in accordance with the exemplary embodiments of this invention.

Figure 6:
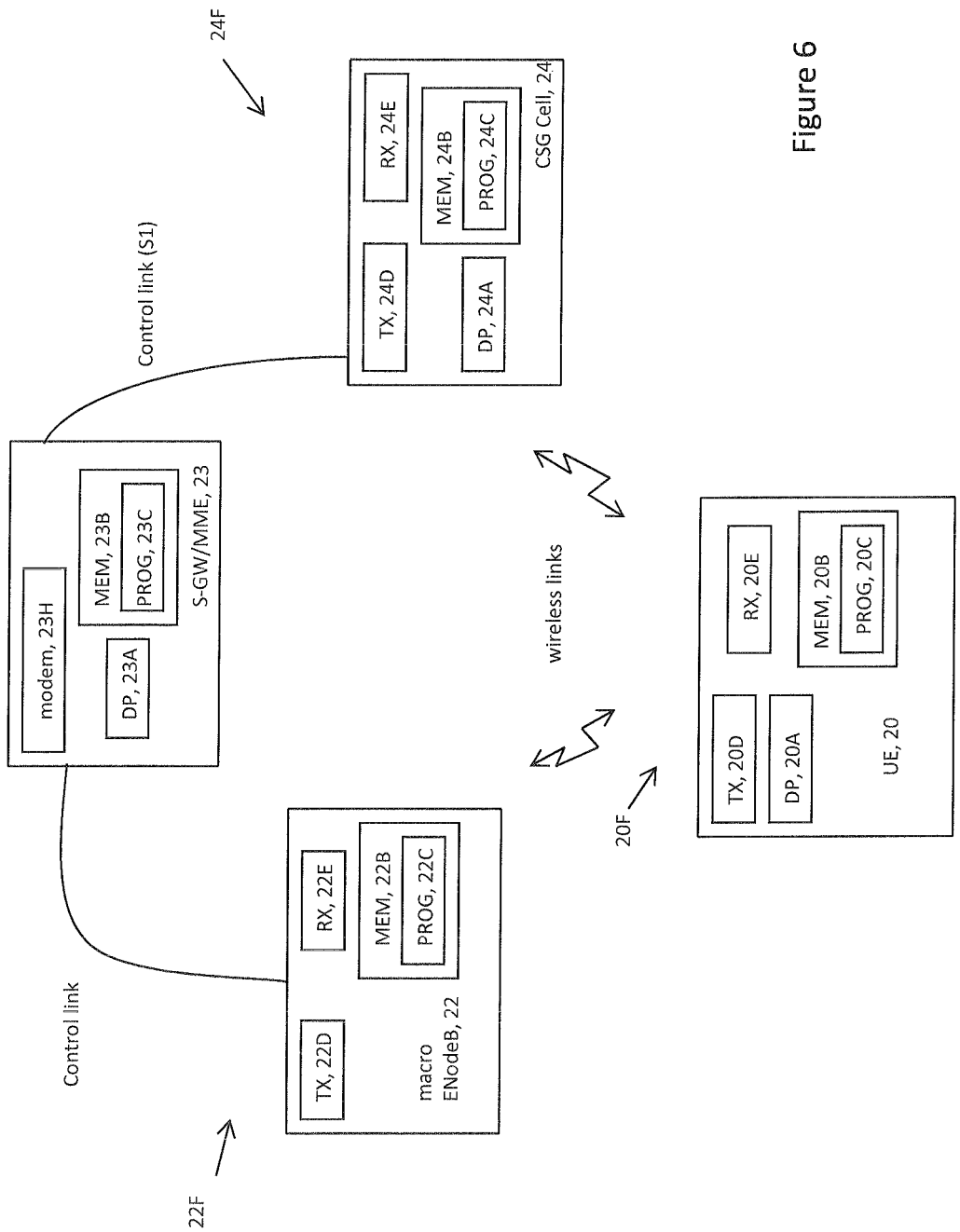
FIG. 6 is a simplified block diagram of various network devices and a UE similar to those shown at FIG. 1, which are exemplary electronic devices suitable for use in practicing the exemplary embodiments.

Reference is now made to FIG. 6 for illustrating a simplified block diagram of various electronic devices and apparatus that are suitable for use in practicing the exemplary embodiments of this invention. In FIG. 6 a serving first cell/macro cell 22 is adapted for communication over a wireless link with a mobile apparatus, such as a mobile terminal or UE 20. The macro cell 22 may be a macro eNodeB, a remote radio head or relay station, or other type of base station/cellular network access node.

The UE 20 includes processing means such as at least one data processor (DP) 20A, storing means such as at least one computer-readable memory (MEM) 20B storing at least one computer program (PROG) 20C, and also communicating means such as a transmitter TX 20D and a receiver RX 20E for bidirectional wireless communications with the CSG cell 24 via one or more antennas 20F. Also shown for the UE 20 at block 20G is a list implemented as the CSG whitelist.

The CSG cell 24 includes its own processing means such as at least one data processor (DP) 24A, storing means such as at least one computer-readable memory (MEM) 24B storing at least one computer program (PROG) 24C, and communicating means such as a transmitter TX 24D and a receiver RX 24E for bidirectional wireless communications with other UEs under its control via one or more antennas 24F. There is a data and/or control path, termed at FIG. 6 as a control link which in the LTE system may be implemented as an Si interface, coupling the CSG cell 24 with the S-GW/MME 23 and over which the CSG cell 24 may receive the UE's CSG whitelist in various embodiments above.

For completeness, but not required for embodiments of the invention, FIG. 6 also shows a cell/macro cell 22, which includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F.

Similarly, the S-GW/MME 23 includes processing means such as at least one data processor (DP) 23A, storing means such as at least one computer-readable memory (MEM) 23B storing at least one computer program (PROG) 23C, and communicating means such as a modem 23H for bidirectional communication with the CSG cell 24 over the control link. While not particularly illustrated for the UE 20 or CSG cell 24, those devices are also assumed to include as part of their wireless communicating means a modem which may be inbuilt on a radiofrequency RF front end chip within those devices 20, 22, 24 and which chip also carries the TX 20D/22D/24D and the RX 20E/22E/24E. The S-GW/MME 23 also has stored in its local memory at 23G the database which has the CSG whitelists for all the UEs under those various eNodeBs, including CSG cell 24, as the case may be for the various embodiments detailed above.

At least one of the PROGs 20C in the UE 20 is assumed to include program instructions that, when executed by the associated DP 20A, enable the device to operate in accordance with the exemplary embodiments of this invention, as detailed above. The CSG cell 24 and the S-GW/MME 23 also have software stored in their respective MEMs to implement certain aspects of these teachings. In these regards the exemplary embodiments of this invention may be implemented at least in part by computer software stored on the MEM 20B, 22B, 23B which is executable by the DP 20A of the U 20 and/or by the DP 22A/23A of the respective CSG cell 24 and the S-GW/MME 23, or by hardware, or by a combination of tangibly stored software and hardware (and tangibly stored firmware). Electronic devices implementing these aspects of the invention need not be the entire devices as depicted at FIG. 6, but exemplary embodiments may be implemented by one or more components of same such as the above described tangibly stored software, hardware, firmware and DP, or a system on a chip SOC or an application specific integrated circuit ASIC.

Various embodiments of the computer readable MEMs 20B, 22B, 24B and 23B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A, 22A, 24A and 23A include but are not limited to general purpose computers, special purpose computers, microprocessors, digital signal processors (DSPs) and multi-core processors.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The invention claimed is:

1. An apparatus for use in controlling access by a user equipment to at least one cell in a communication network, the apparatus comprising at least one processor and at least one memory including a computer program code, wherein the at least one memory and the computer program code are configured, with the at least one processor, to cause the apparatus at least to:
   store in a memory a list of a plurality of Closed Subscriber Group identifiers (CSG ID) corresponding to the at least one cell to which the apparatus is authorized to access, the plurality of Closed Subscriber Group identifiers (CSG ID) corresponding to at least one cell to which the apparatus is authorized to access;
   while being served by the at least one cell in respect of a first CSG ID during a first predetermined time period, receive a transmission comprising a second, different, CSG ID for use by the cell in a second predetermined time period following expiration of the first predetermined time period; and
   compare the received second CSG ID with CSG IDs on the list to determine whether the apparatus is authorized to continue to be served by the cell during the second predetermined time period,
   whereby when the apparatus is determined to be authorized to continue to be served by the cell during the second predetermined time period, the apparatus is then served by the cell using the second CSG ID, and
   whereby the first CSG ID is the only CSG ID used by the apparatus during the first predetermined time period and the second CSG ID is the only CSG ID used by the apparatus during the second predetermined time period,
   wherein the transmission is a paging message and the comparing of the received second CSG ID with CSG IDs is performed only after and in response to reception of the paging message comprising the second, different, CSG ID.

2. The apparatus according to claim 1, wherein, in the event that the cell is determined not to be authorized to access the second CSG ID, the at least one memory and the computer program code are configured, with the at least one processor, to further cause the apparatus to select a different cell when the apparatus is determined not to be authorized to continue to be served by the cell during the second predetermined time period.

3. The apparatus according to claim 2, wherein the at least one memory and the computer program code are configured, with the at least one processor, to further cause the apparatus to initiate a handover to said different cell.

4. The apparatus according to claim 1, wherein the at least one memory and the computer program code are configured, with the at least one processor, to further cause the apparatus to receive the second CSG ID via a paging message.

5. The apparatus according to claim 1, wherein the apparatus comprises a modem.

6. A method of controlling access to a cell in a communication network, the method comprising:
   receiving a plurality of Closed Subscriber Group identifiers (CSG IDs) assigned to the cell, the plurality of Closed Subscriber Group identifiers (CSG ID) corresponding to at least one cell to which the apparatus is authorized to access;
   selecting and transmitting a first CSG ID from the plurality of CSG IDs on the basis of a first load condition on the cell for use during a first predetermined time period, whereby the first CSG ID is the only CSG ID used by the apparatus during the first predetermined time period; and
   selecting and transmitting a second, different, CSG ID from the plurality of CSG IDs on the basis of a second, different, load condition on the cell for use during a second predetermined time period following expiration of the first time period, whereby the second CSG ID is the only CSG ID used by the apparatus during the second predetermined time period, wherein the transmission is a paging message and the comparing of the received second CSG ID with CSG IDs is performed only after and in response to reception of the paging message comprising the second, different, CSG ID.

7. The method according to claim 6, further comprising identifying a group of CSG IDs from said plurality of CSG IDs, said group comprising at least said first and second CSG IDs; and thereafter consecutively selecting and transmitting said different CSG ID from said group of CSG IDs for respective predetermined time periods in dependence on changes to load conditions on the cell.

8. The method according to claim 6, wherein each of said plurality of CSG IDs has an access priority associated therewith, and the method further comprises selecting at least one of said first CSG ID and said second CSG ID on the basis of the associated access priority.

9. The method according to claim 8, further comprising broadcasting said selected first or second CSG ID in a system information message.

10. The method according to claim 8, wherein, in response to selection of said second CSG ID, the method further comprises selectively transmitting a message comprising said second CSG ID to at least one user equipment being served by said cell, whereby said at least one user equipment is triggered, in response to reception of the transmitted message, to verify access to said cell on the basis of said second CSG ID.

11. The method according to claim 10, wherein said message is a paging message.

12. A method of controlling access by a user equipment to at least one cell in a communication network, the method comprising:

storing in a memory a list of a plurality of Closed Subscriber Group identifiers (CSG ID) corresponding to the at least one cell to which the apparatus is authorized to access;

while being served by the at least one cell in respect of a first CSG ID during a first predetermined time period, receiving a transmission comprising a second, different, CSG ID for use by the cell in a second predetermined time period following expiration of the first predetermined time period, whereby the first CSG ID is the only CSG ID used by the apparatus during the first predetermined time period and the second CSG ID is the only CSG ID used by the apparatus during the second predetermined time period; and comparing the received second CSG ID with CSG IDs on the list to determine whether the apparatus is authorized to continue to be served by the cell during the second predetermined time period, whereby when the apparatus is determined to be authorized to continue to be served by the cell during the second predetermined time period, the apparatus is then served by the cell using the second CSG ID, wherein the transmission is a paging message and the comparing of the received second CSG ID with CSG IDs is performed only after and in response to reception of the paging message comprising the second, different, CSG ID.

13. The method according to claim 12, wherein, in the event that the cell is determined not to be authorized to access the second CSG ID, the method further comprises selecting a different cell when the apparatus is determined not to be authorized to continue to be served by the cell during the second predetermined time period.

14. The method according to claim 13, further comprising initiating a handover to said different cell.

15. The method according to claim 12, wherein the second CSG ID is received via a paging message.

16. The apparatus according to claim 1, wherein the transmission is a paging message and the comparing of the received second CSG ID with CSG IDs on the list is performed only after and in response to reception of the paging message comprising the second, different, CSG ID.

* * * * *